United States Patent
Bravenec et al.

[11] Patent Number: 5,974,967
[45] Date of Patent: Nov. 2, 1999

[54] REGISTRATION SYSTEM FOR LENTICULAR PRINTING

[75] Inventors: Daniel W. Bravenec, Castle Rock, Colo.; Gary C. Marsh, Kopperl, Tex.

[73] Assignee: LenticularTechnologies, L.L.C., Irving, Tex.

[21] Appl. No.: 09/141,459

[22] Filed: Aug. 27, 1998

[51] Int. Cl.$^6$ ............................... B41F 5/16; B41M 1/12
[52] U.S. Cl. .................... 101/211; 101/183; 101/485; 101/486; 101/DIG. 30
[58] Field of Search ...................... 101/181, 183, 101/211, 485, 486, DIG. 29, DIG. 36, DIG. 30; 347/2

[56] References Cited

U.S. PATENT DOCUMENTS

| | | | |
|---|---|---|---|
| 5,056,430 | 10/1991 | Bayerlein et al. | 101/211 |
| 5,068,810 | 11/1991 | Ott | 101/211 |
| 5,181,257 | 1/1993 | Steiner et al. | 101/211 |
| 5,724,437 | 3/1998 | Bucher et al. | 101/211 |
| 5,806,430 | 9/1998 | Rodi | 101/211 |
| 5,809,894 | 9/1998 | Goldstein | 101/211 |
| 5,812,152 | 9/1998 | Torigoe et al. | 347/2 |
| 5,819,655 | 10/1998 | Dellivenneri et al. | 101/211 |

*Primary Examiner*—Eugene Eickholt
*Attorney, Agent, or Firm*—Polster, Lieder, Woodruff & Lucchesi

[57] ABSTRACT

A registration system (10) maintains registration of colors printed on a lenticular material (M) by a printing press (P) to form an image (I). A predetermined pattern (12) is printed on the material together with the image. A camera (36) obtains an image of each printed pattern as the lenticular material moves from one end of the press to the other, a strobe (40) and an image magnifier (34) also being used for this purpose. A monitor (32) displays the image for an observer to determine if the printed colors are properly registering with each other. A controller (46) for adjusting the position of print rollers (R) is operable by the observer to adjust the rollers, as necessary, for an observed printed color determined to be not properly registering with the other printed colors to be brought into registry therewith. A baseline pattern (14) is printed as are bars (28) for each printed color. By monitoring the relative position of the bars to the baseline pattern, the alignment of each color is readily determined and appropriate adjustments made, if necessary.

17 Claims, 2 Drawing Sheets

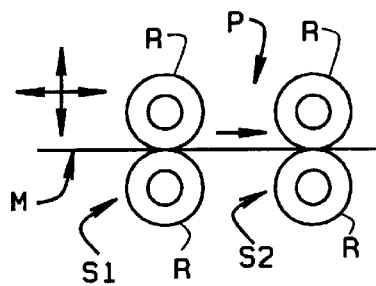
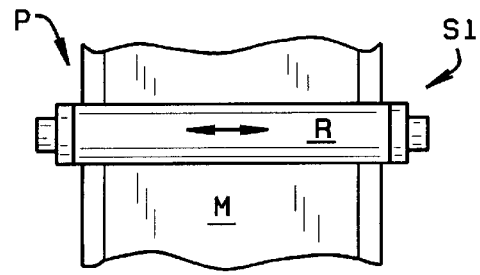
FIG. 1A    FIG. 1B
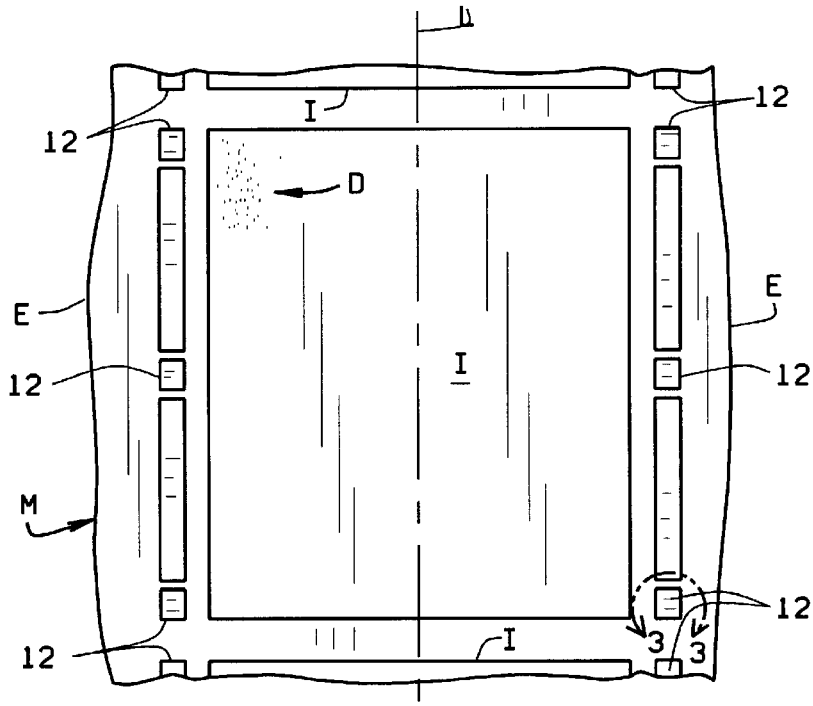
FIG. 2
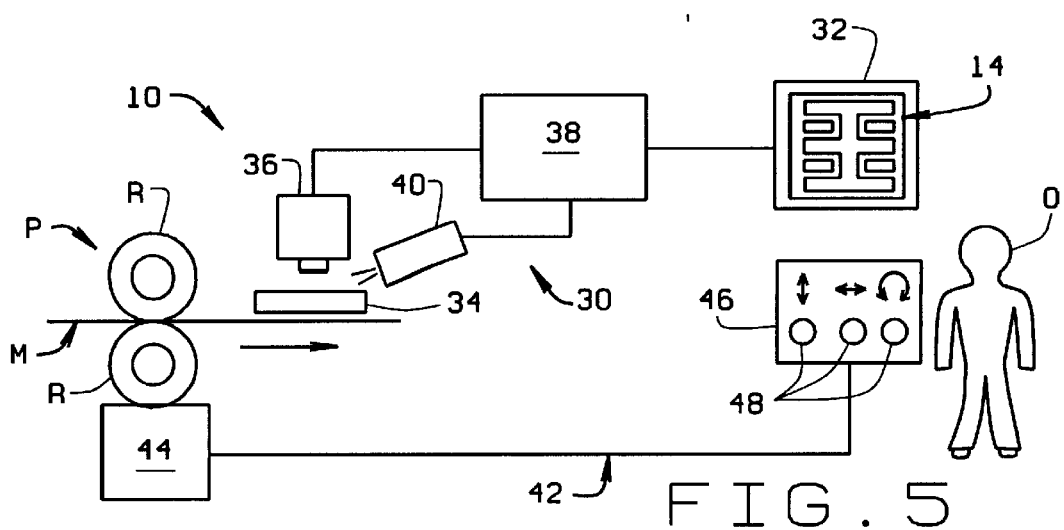
FIG. 5

5,974,967

REGISTRATION SYSTEM FOR LENTICULAR PRINTING

CROSS-REFERENCE TO RELATED APPLICATIONS

U.S. patent application Ser. No. 082,715/09 filed May 21, 1998.

STATEMENT REGARDING FEDERALLY SPONSORED RESEARCH OR DEVELOPMENT

Not applicable.

BACKGROUND OF THE INVENTION

This invention relates to the printing of thin sheet lenticular lens materials, and more particularly, to a registration system for aligning a web of lenticular material on which images are printed with print rolls of a printing press so to adjust the lens material and printing plates for printing various of the colors used to print the images on the material. The registration system allows these adjustments to be made dynamically during an actual print run.

In co-pending U.S. patent application Ser. No. 082,715/09, there is described a method for printing images on thin sheet lenticular materials. A key feature of this method is the alignment of the color negatives, or plates made from the negatives, both to each other and to the lens material on which the images are printed. An alignment system is employed by which the registry of the colors are checked against a reference color so the plates can be adjusted orthogonally, laterally, and rotationally as need be. While the alignment described therein works well for its intended purpose, use of the system necessitates that a few images be printed on the flat side of the lenticular material, the color registration be checked using the system, adjustments to the plates alignments be made, if necessary, and additional images be printed to verify that the revised alignment indeed corrects whatever minor misalignments there may have been.

Most printing presses, and particularly those used for volume printing, have some type of system, usually hydraulic, by which the print rolls can be adjusted while a job is being run. The hydraulic or other control system permits minor adjustments in the rolls up and done, back and forth, and in and out. As described in the co-pending application, the thinness of the material and the number of lenticules per inch (LPI) of the material means that there is almost no margin for error in alignment in order to provide a quality lenticular product. It will be appreciated that despite the care and precision with which the process described in the copending application is carried out, that once a print run begins, changes may still occur which effect the registration. If the run must be stopped to make necessary adjustments, this creates delays and adds to the cost of the job.

BRIEF SUMMARY OF THE INVENTION

Among the several objects of the present invention may be noted the provision of a registration system for use in printing on lenticular materials;

the provision of such a registration system which helps maintain an alignment between printing plates used for the different colors with which an image is printed on the material;

the provision of such a registration system in which the plates are aligned both with each and the lens material prior to start of a print run, the system helping dynamically maintain this alignment during the run so the run can be continuous once its begun;

the provision of such a registration system including a baseline registration pattern printed on the lenticular material with each image, the pattern including not only a reference color, but also each of the other colors printed;

the provision of such a registration system further including means for viewing the registration pattern as a web of lenticular material runs through the press, viewing of the pattern allowing a press run operator to readily discern any changes in the pattern which would indicate possible misalignment;

the provision of such a registration system by which the operator can adjust the position of individual print rolls by which the respective colors are separately printed on the web so to correct for observed changes in alignment;

the provision of such a registration system in which the pattern is observed throughout the print run and changes are made dynamically without the press having to be shut down;

the provision of such a registration system which is very small when printed on the lenticular material, but which is readily magnified for observation by the operator;

the provision of such a registration system in which each pattern is printed multiple times for each image printed and on both sides of the image, thereby to facilitate observation of the pattern;

the provision of such a registration system to employ a light strobe operable at a variable frequency, the strobe being adjustable to the speed of the printing press thereby to synchronize the operation of the system with that of the press; and, the provision of such a registration system to provide high quality printed lenticular materials at a lower operational cost than has previously been possible.

In accordance with the invention, generally stated, a registration system is for maintaining registration of colors printed on a lenticular material by a printing press, this being done to produce high quality printed images comprising. A predetermined pattern is printed on the material together with the printed image. A camera obtains an image of each printed pattern as the lenticular material moves from one end of the press to the other, both a strobe and image magnifier also being used for this purpose. A monitor displays the image for an observer to determine if the printed colors are properly registering with each other. A controller for adjusting the position of print rollers is operable by the observer to adjust the rollers, as necessary, for an observed printed color determined to be not properly registering with the other printed colors to be brought into registry therewith. Other objects and features will be in part apparent and in part pointed out hereinafter.

BRIEF DESCRIPTION OF THE SEVERAL VIEWS OF THE DRAWINGS

In the drawings, FIGS. 1A and 1B illustrate printing on a sheet of lenticular material wherein FIG. 1A is a side elevational view of a portion of a printing press and FIG. 1B is a top plan view thereof;

FIG. 2 is a plan view of a printed sheet of lenticular illustrating a portion of the registration system of the present invention;

FIGS. 4A–4D are respective illustrations indicating registry of a print color to registration bars printed on the material wherein FIG. 4A illustrates proper registration of a color to the baseline, and FIGS. 4B–4D illustrate various patterns which occur when the colors are not in registry; and, FIG. 5 is a simplified representation of the registration system of the present invention.

Corresponding reference characters indicate corresponding parts throughout the drawings.

DETAILED DESCRIPTION OF THE INVENTION

Figure 3:
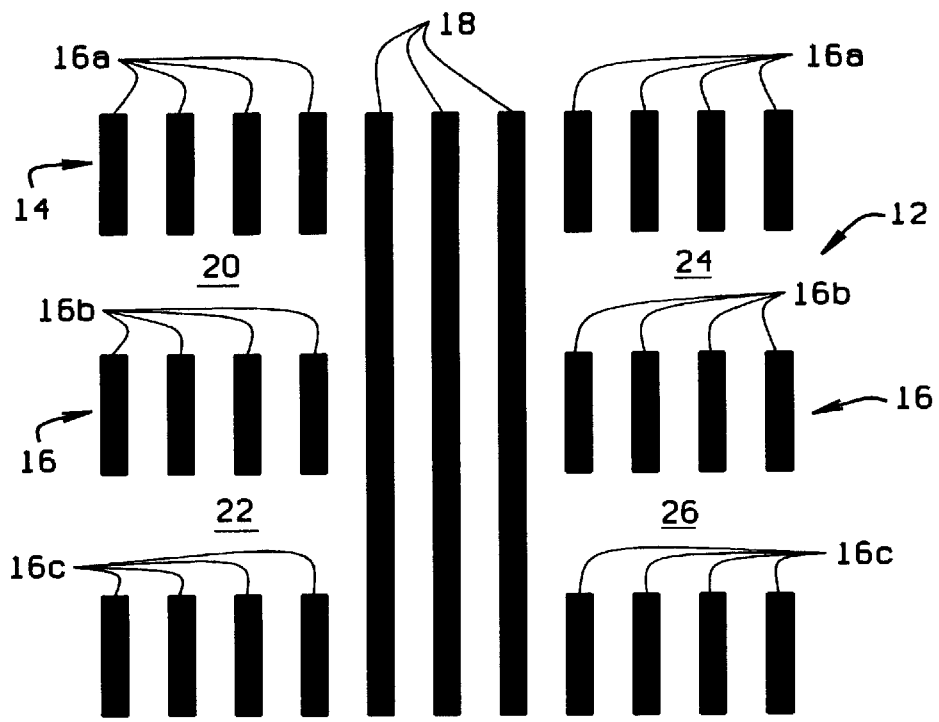
FIG. 3 is an enlarged view of the section 3—3 in FIG. 2 illustrating a portion of a baseline color registration pattern printed on the lenticular material.

Referring to the drawings, a registration system 10 of the present invention is shown in FIG. 5. As described herein, the system maintains registration of colors printed on a lenticular material M by a printing press P to produce high quality printed images I (see FIG. 3) on a flat side of the lenticular material. As shown in FIGS. 1A and 1B, the printing press includes sets R1, R2 of rollers R, there being a set of rollers for each color with which the image is printed. Each set of rollers has an associated printing plate (not shown) for printing that portion of the image associated with a particular color. Printing press P can be used for lithographic (offset) printing, flexographic (direct) printing, or other types of printing, all without departing from the scope of this invention.

As shown in FIGS. 2 and 3, a color registration pattern 12 is printed on the lenticular material together with the images. It will be understood that the image I is repetitively printed on the lenticular material as the material passes through the press. As shown in FIG. 2, each printed image is spatially separated from the adjacent printed images, and at least one color registration pattern 12 is printed with each image. Preferably, a plurality of color registration patterns 12 are printed with each image. Again as shown in FIG. 2, each image I is generally printed in the middle of the sheet of lenticular material and is centered about a longitudinal centerline L of the material. A plurality of color registration patterns 12 are printed along both sides of the image. In FIG. 2, three patterns 12 are printed along each side of the image; one pattern at each end of the image, and one pattern in the middle. It will be understood that the patterns as shown in FIG. 2 are exemplary only, and that a variety of other arrangements could be printed without departing from the scope of this invention. The patterns are printed between each side of the image and an adjacent edge E of the lenticular material. At the end of the press, all of the material except for image I are cut away from the web of material in a trimming operation and discarded.

As shown in FIG. 3, color registration pattern 12 includes a baseline pattern 14 to which one of the colors (black) with which the image is printed is registered. This baseline pattern is formed of a series of bars 16, 18 extending parallel to each other. The bars 18, which form the center of the pattern, are solid bars extending the length of the pattern. The bars 16, which are formed to either side of the center bars 18, comprise a plurality of bar segments 16a, 16b, 16c. These segments are spaced apart from and axially align with each other. While four bars 16 are shown each side of three bars 18 in FIG. 3, the number of each of the bars is exemplary only, and there may be more or fewer bars of either type without departing from the scope of the invention. Baseline pattern 14 has a plurality of locations 20, 22, 24, 26 at each of which one of the other colors used in printing the image is also printed for checking the registration of that color to each of the baseline to determine if the dots D (see FIG. 2) of that color printed on the lenticular material to form image I are in registry. The process by which this registration and alignment is initially established is described in the above referenced co-pending application and will not be described herein.

Figure 4A:
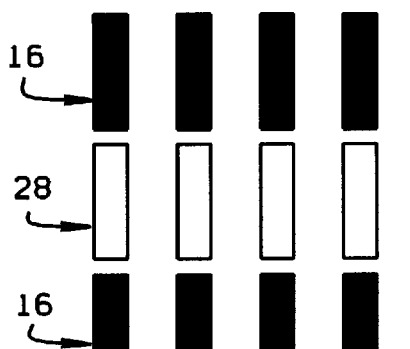
Figure 4C:
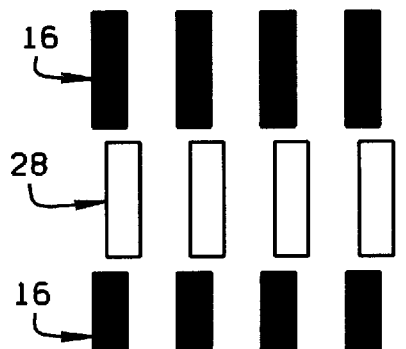
Figure 4B:
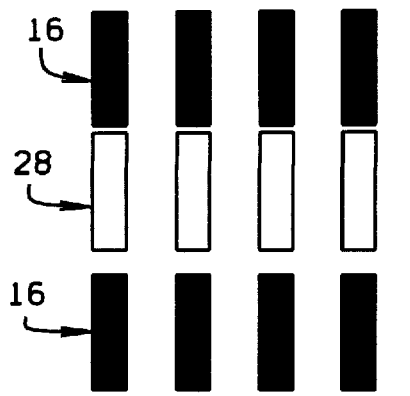
Figure 4D:
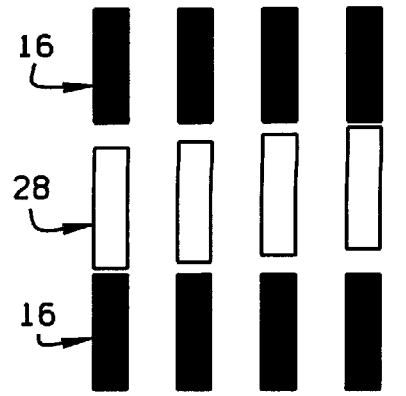

Each of the other colors used in printing image I are printed as a series of bars 28 (see FIGS. 4A–4D) interspaced between adjacent bar segments of the baseline pattern. That is, as shown in FIG. 5, the bars 28 are printed in one of the interspatial areas 20–26. The series of color bars 28 align with the bar segments forming the baseline pattern if the colors are in registry, each set of bars 28 being printed in the same color as are the dots printed on the lenticular material to form image 1. This is as shown in FIG. 4A. FIGS. 4B–4D now indicate there are six different alignment checks made to see if there is still the proper registration. In to out is checked, as shown in FIG. 4B, by determining if the bars 28 are centered between the bar segments 16. If they are, then the colors still align. But, if the ends of the bars 28 are closer to one of the segments 16, or if they overlap, then an adjustment needs to be made. In FIG. 4C, if the bars 28 are to one side or the other of bar segments 16, this also signifies that an adjustment needs to be made. If the bars 28 are rotated in either direction with respect to bar segments 16, as shown in FIG. 4D, this further indicates the need for adjustment to achieve proper alignment and color registration. As indicated by the arrows in FIGS. 1A and 1B, the respective sets of rollers are adjustable, based upon the bar 28 pattern viewed by an observer to adjust the rollers in the appropriate direction to bring the color back into proper registration. Each color used in the printing process has appropriate bars 28 printed in one of the space 20–26. Each color bar pattern is separately checked against the baseline pattern to determine what adjustments, if any, to its associated set of rollers needs to be made.

System 10 includes an imaging means 30 for obtaining an image of printed pattern 14, as the lenticular material with the printed image is drawn through press P, and a monitor 32 for displaying the printed pattern. The displayed pattern is viewable by an operator 0 who can determine from the displayed printed pattern as to whether the printed colors are properly registering with each other, or whether they are not. As shown in FIG. 5, both baseline pattern and 14 and series of bars 28 for the different colors are displayed. The observer viewing the monitor is thus able to determine if the bars 28 for each color align as shown in FIG. 4A, or whether there is a misalignment as shown in FIGS. 4B–4D. It will be understood that the bars 28 may exhibit more than one type of misalignment so what is viewed on monitor 32 may be a composite of what is shown in FIGS. 4B–4D.

Display means 30, in addition to monitor 32, includes means 34 for magnifying the printed pattern to make the pattern image more readily viewable by the operator. Means 34 can be a magnification device such a lens which has a 30X or 40X range of magnification. A video camera 36 views the passing images through the lens and provides the magnified image to an image processor 38. Or, the image processor is responsive to an unmagnified image captured by the camera to provide the magnification. Regardless, the image processor filters out distortions, and significantly enhances the viewed image so what is displayed on monitor 34 is a sharp, clear image of the baseline pattern and the color bars for the respective colors. Monitor 34 is a color monitor so the colors for the baseline pattern and each printed color are readily determinable.

It will be appreciated by those skilled in the art that the lenticular material is drawn through printing press P at a high rate of speed. Thus, the registration patterns printed with each image pass very quickly beneath camera 36. To acquire and hold an image of the pattern, so it can be readily viewed on monitor 32, imaging means 30 further includes a strobe 40 which projects a beam of light onto printed material passing beneath the camera. Strobe 40 projects light at a frequency controllable to match the speed of the press. This, in turn, causes the patterns 14 printed with the image to be isolated by the beam of light illuminating them so the pattern appears to be stationary when viewed by the camera; even though the patterns are passing beneath the camera at a high rate of speed.

Finally, registration system 10 includes a control means 42 operable by the press operator to dynamically adjust the printing of any color determined not to be in registry with the other printed colors so that color can be brought back into registry with the others. The printing press includes a hydraulic system 44 or the like by which each set S of rollers R can be moved. The operator has a control panel 44 with appropriate controls 48 which are operable to adjust the position of the rollers (and hence the printing plate used with the rollers) relative to the lenticular material passing through the set of rollers so to adjust the alignment of the series of bars 28 printed for a color with the bar segments 16 of baseline pattern 14 and bring the color into registry.

What has been described is a registration system used for lenticular printing to maintain alignment of printing plates used for the different colors with which an image is printed. The printing plates are aligned to each and the lens material prior to printing. The registration system dynamically maintains this alignment throughout the run which is continuous. A baseline registration pattern is printed on the material along with each image. The pattern includes both a reference color and each other color printed. The pattern is observable by a press operator who can readily see any pattern changes indicating possible misalignment. This allows the operator to adjust individual rollers to correct for any alignment changes. The pattern is printed multiple times with each image printed and a strobe is used to synchronize viewing of the pattern with the speed of the press. Use of the system results in high quality lenticular materials printed at low cost.

In view of the foregoing, it will be seen that the several objects of the invention are achieved and other advantageous results are obtained.

As various changes could be made in the above constructions without departing from the scope of the invention, it is intended that all matter contained in the above description or shown in the accompanying drawings shall be interpreted as illustrative and not in a limiting sense.

We claim:

1. A registration system for maintaining registration of colors printed on a lenticular material by a printing press so to produce high quality printed images comprising:

a color registration pattern printed on said material together with said color image, said color registration pattern including a baseline pattern to which one of the colors for the image is registered, said baseline pattern having a plurality of locations at each of which one of the other colors used in printing the image is printed for checking the registration of said colors to each other;

imaging means obtaining an image of said printed pattern as said material is drawn through said press;

a display displaying said printed pattern for an observer observing said displayed printed pattern to determine if the printed colors are properly registering with each other; and, control means operable by said observer to dynamically adjust the printing of any color determined not to be in registry with the other printed colors for said color to be in registry therewith.

2. The registration system of claim 1 wherein an image is repetitively printed on said material as the material passes through said press, each printed image being spatially separated from a previously printed image, and the system includes at least one color registration pattern being printed with each printed image.

3. The registration system of claim 2 wherein a plurality of color registration patterns are printed with each image.

4. The registration system of claim 3 wherein said image is generally printed in the middle of the material and centered about a longitudinal centerline thereof, and a plurality of color registration patterns are printed with said image on both sides thereof, said patterns being printed between one side of said image and an adjacent edge of said material.

5. The registration system of claim 1 wherein said color registration pattern includes a series of bars extending parallel to each other, each bar comprising a plurality of bar segments spaced apart from and axially aligned with each other, one of the other colors used in printing the image being printed as a series of bars interspaced between adjacent bar segments of said baseline pattern.

6. The registration system of claim 5 wherein said series of interspaced color bars align with the bar segments forming said baseline pattern if the colors are in registry.

7. The registration system of claim 6 wherein said display means includes a monitor on which said baseline pattern and said series of bars for each color are displayed, said observer viewing said display being able to determine the alignment of the bars for each printed color with respect to the adjoining bar segments.

8. The registration system of claim 7 wherein said printing press includes sets of rollers, one set for each color printed, each set of rollers having an associated printing plate for printing that portion of the image associated with a particular color, the control means being operable by the observer to adjust the position of the printing plate relative to the material, as the material passes through the set of rollers with which the plate is associated thereby to adjust the alignment of the series of bars printed for that color to bring the bars into alignment with the bar segments of the baseline pattern and the color into registry.

9. The registration system of claim 1 wherein said imaging means includes a camera for capturing an image of said printed pattern.

10. The registration system of claim 9 wherein said imaging means includes means magnifying said printed pattern to make the image more readily viewable by an observer.

11. The registration system of claim 10 wherein said display means includes a monitor on which said printed pattern is displayed.

12. The registration system of claim 11 wherein said material is drawn through said printing press at a high rate of speed and said registration system further includes a strobe which projects a beam of light onto said printed material, the strobe projecting said light at a frequency controllable to match the frequency at which said printed pattern appears before said camera thereby to enhance the display of said printed pattern for viewing by said observer.

13. The registration system of claim 11 wherein said displayed pattern enables said observer to determine if any of the printed colors is misaligned along an axis parallel to that of the material as it is drawn through the press, or an axis perpendicular to that axis, or in a rotational direction, said control means enabling said observer to correct for a misalignment in any of these directions.

14. In a printing operation in which a material is run through a press and an image is printed on the material, the image comprising a plurality of colors one of each of which is printed on the material at successive locations along the press, a registration system for maintaining registration of colors printed on the material so to produce a quality printed product comprising:

a color registration pattern printed on said material together with the image printed thereon, said color registration pattern including a baseline pattern to which one of the colors for the image is registered, said baseline pattern having a plurality of locations at each of which one of the other colors used in printing the image is printed for checking the registration of said colors to each other, the baseline pattern comprising a series of bars extending parallel to each other, each bar comprising a plurality of bar segments spaced apart from and axially aligned with each other, one of the other colors used in printing the image being printed as a series of bars interspaced between adjacent bar segments of said baseline pattern, said series of interspaced color bars aligning with the bar segments forming said baseline pattern if the colors are in registry;

imaging means obtaining an image of said printed pattern as said material is drawn through said press;

a display displaying said printed pattern for an observer observing said display to determine if the colors printed on the material properly register with each other; and, control means operable by said observer to dynamically adjust the printing of any printed color determined not to be in registry with the other printed colors for said color to be brought into registry therewith.

15. The registration system of claim 14 wherein said material is drawn through said printing press at a high rate of speed and said registration system further includes a strobe which projects a beam of light onto said printed material, the strobe projecting said light at a frequency controllable to match the frequency at which said printed pattern appears before said camera thereby to enhance the display of said printed pattern for viewing by said observer.

16. A method of registering a plurality of colors used to print an image formed on a lenticular material drawn through a printing press comprising:

printing said image on said material and printing a color registration pattern together with said image, said color registration pattern including a baseline pattern to which one of the colors for the image is registered, said baseline pattern having a plurality of locations at each of which one of the other colors used in printing the image is printed for checking the registration of said colors to each other, the baseline pattern comprising a series of bars extending parallel to each other, each bar comprising a plurality of bar segments spaced apart from and axially aligned with each other, each of the other colors used in printing the image being printed as a series of bars interspaced between adjacent bar segments, said series of interspaced color bars aligning with the bar segments forming said baseline pattern if the colors are in registry;

obtaining an image of said printed pattern as said material is drawn through said press;

displaying said printed pattern for an observer observing said displayed printed pattern to determine if the printed colors are properly registering with each other; and, dynamically controlling operation of the press to adjust the printing of any color determined not to be in registry with the other printed colors for said color to be in registry therewith.

17. The method of claim 16 wherein said material is drawn through said printing press at a high rate of speed and the method further includes projecting a strobe light onto said printed material said strobe light being projected at a frequency controllable to match the frequency at which said printed pattern appears before a camera used to obtain an image of said printed pattern thereby to enhance the display of said printed pattern for viewing by said observer.

* * * * *